US010882985B2

(12) United States Patent
Kobayashi et al.

(10) Patent No.: US 10,882,985 B2
(45) Date of Patent: Jan. 5, 2021

(54) RUBBER-BASED COMPOSITION MODIFIER, AND VULCANIZATE AND MOLDED PRODUCT OF RUBBER COMPOSITION CONTAINING THE RUBBER-BASED COMPOSITION MODIFIER

(71) Applicant: DENKA COMPANY LIMITED, Tokyo (JP)

(72) Inventors: Naoki Kobayashi, Itoigawa (JP); Yasushi Abe, Itoigawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 15/776,029

(22) PCT Filed: Nov. 15, 2016

(86) PCT No.: PCT/JP2016/083745
§ 371 (c)(1),
(2) Date: May 14, 2018

(87) PCT Pub. No.: WO2017/086282
PCT Pub. Date: May 26, 2017

(65) Prior Publication Data
US 2018/0327576 A1  Nov. 15, 2018

(30) Foreign Application Priority Data

Nov. 16, 2015  (JP) ................. 2015-223608

(51) Int. Cl.
| C08L 11/00 | (2006.01) |
| C08L 23/08 | (2006.01) |
| C08L 23/04 | (2006.01) |
| C08J 3/22  | (2006.01) |
| C08L 9/00  | (2006.01) |
| C08L 7/00  | (2006.01) |
| C08L 23/16 | (2006.01) |
| C08K 3/22  | (2006.01) |

(52) U.S. Cl.
CPC .............. *C08L 11/00* (2013.01); *C08J 3/226* (2013.01); *C08L 7/00* (2013.01); *C08L 9/00* (2013.01); *C08L 23/04* (2013.01); *C08L 23/08* (2013.01); *C08L 23/16* (2013.01); *C08J 2411/00* (2013.01); *C08K 2003/222* (2013.01); *C08K 2201/006* (2013.01); *C08L 2205/03* (2013.01)

(58) Field of Classification Search
CPC ..... C08L 11/00; C08L 23/08; C08K 2003/222
See application file for complete search history.

(56) References Cited

U.S. PATENT DOCUMENTS

| 8,530,547 B2 * | 9/2013 | Abe ................. C08F 36/18 |
| | | 524/106 |
| 9,522,993 B2 * | 12/2016 | Kobayashi ............. C08L 11/00 |
| 2014/0187669 A1 | 7/2014 | Tsujimoto et al. |
| 2015/0259520 A1 | 9/2015 | Kobayashi et al. |

FOREIGN PATENT DOCUMENTS

| CN | 101796123 A | 8/2010 | |
| CN | 104662078 A | 5/2015 | |
| JP | 558-183235 A | 10/1983 | |
| JP | H11-323020 A | 11/1999 | |
| JP | 2001-131341 A | 5/2001 | |
| JP | 2001-343049 A | 12/2001 | |
| JP | 2001-343072 A | 12/2001 | |
| JP | 2001-343091 A | 12/2001 | |
| JP | 2005-060581 A | 3/2005 | |
| JP | 2008179717 A * | 8/2008 | |
| JP | 5412010 B | 2/2014 | |
| JP | 2014-125613 A | 7/2014 | |
| TW | 201410766 A | 3/2014 | |
| WO | 2014/041649 A1 | 3/2014 | |
| WO | WO-2014041856 A1 * | 3/2014 | ............. C08L 11/00 |
| WO | 2015/136792 A1 | 9/2015 | |

OTHER PUBLICATIONS

Machine translation of JP 2008-179717 A, published Aug. 7, 2008. (Year: 2008).*
PCT/ISA/210, "International Search Report for International Application No. PCT/JP2016/083745," dated Dec. 27, 2016.

* cited by examiner

*Primary Examiner* — Vickey Nerangis
(74) *Attorney, Agent, or Firm* — Manabu Kanesaka

(57) ABSTRACT

A rubber-based composition modifier includes 100 parts by mass of a mixed rubber component containing a chloroprene rubber and at least one copolymer selected from ethylene/α-olefin copolymers and ethylene/α-olefin/unconjugated polyene copolymers, 10 to 60 parts by mass of magnesium oxide, 3 to 30 parts by mass of a softener, and 30 to 120 parts by mass of acetylene black, wherein the mixed rubber component has a Mooney viscosity, as determined by the method specified in JIS K6300, of 60 to 180 at 100° C.; the magnesium oxide has a BET specific surface area, as determined by the one point method specified in JIS Z8830, of 20 to 150 m²/g; the softener contains a fatty acid ester-based plasticizer and an unsaturated fatty acid having a carbon number of 10 to 24 and containing an ester bond, a hydroxyl group, or both of them in part of the structure.

14 Claims, No Drawings

RUBBER-BASED COMPOSITION MODIFIER, AND VULCANIZATE AND MOLDED PRODUCT OF RUBBER COMPOSITION CONTAINING THE RUBBER-BASED COMPOSITION MODIFIER

RELATED APPLICATIONS

The present application is National Phase of International Application No. PCT/JP2016/083745 filed Nov. 15, 2016, and claims priority from Japanese Application No. 2015-223608, filed Nov. 16, 2015, the disclosure of which is hereby incorporated by reference herein in its entirety.

TECHNICAL FIELD

The present invention relates to a rubber-based composition modifier and a vulcanizate and a molded product of a rubber composition containing the rubber-based composition modifier.

BACKGROUND ART

Chloroprene rubbers, which are superior in mechanical properties and flame resistance, have been used widely as a material for industrial rubber products. Recently, properties demanded for industrial rubber products are becoming significantly severer and, in addition to the mechanical properties and flame resistance described above, high heat and ozone resistance is also demanded for these products.

On the other hand, chloroprene rubbers have a shortcoming in that they are lower in heat resistance and ozone resistance, compared to polymethylene-based saturated-main chain rubber materials, as they contain double bonds in the polymer main chain even after vulcanization. For that reason, various studies have been conducted to eliminate the shortcoming in heat resistance and ozone resistance (see Patent Documents 1 to 7). For example in the case of the chloroprene rubber compositions described in Patent Documents 1 to 3, it was intended to improve heat resistance and ozone resistance by using a hydrogenated chloroprene-based polymer that was prepared by hydrogenation of a chloroprene-based polymer.

Alternatively, in the case of the rubber compositions described in Patent Documents 4 to 6, it was intended to improve the heat resistance of vulcanizate by blending a chloroprene rubber with a carbon black that has an average stack layer height in the C axis direction of the layer plane in its crystal lattice, LC, of 2 nm or more, zinc powder, and additionally a particular plasticizer in combination therewith. On the other hand, in the case of the rubber composition described in Patent Document 7, it was intended to improve the heat resistance of vulcanizate by blending a chloroprene rubber with a foreign elastomer component and additionally a particular zinc powder and magnesium oxide in particular amounts.

CITATION LIST

Patent Documents

[Patent Document 1] JP-A No. 2001-343091
[Patent Document 2] JP-A No. 2001-343072
[Patent Document 3] JP-A No. 2001-343049
[Patent Document 4] JP-A No. H11-323020
[Patent Document 5] JP-A No. 2001-131341
[Patent Document 6] JP-A No. 2005-60581
[Patent Document 7] Japanese Patent No. 5412010

SUMMARY OF THE INVENTION

Technical Problem

However, the conventional rubber compositions described in Patent Documents 1 to 7 above, to which a special chloroprene rubber structure is introduced, are less flexible in use or cannot give a technology that improves the heat resistance and ozone resistance of chloroprene rubber materials simultaneously. Meanwhile, it is desired to prevent scattering of powdery additives from the point of workplace working environment and thus, there exists a need for application of masterbatch-type modifier.

Accordingly, the main object of the present invention is to provide a rubber-based composition modifier that gives a vulcanizate superior in heat resistance and ozone resistance, and a vulcanizate and a molded product of a rubber composition containing the rubber-based composition modifier.

Solution to Problem

The rubber-based composition modifier according to the present invention comprises 100 parts by mass of a mixed rubber component containing a chloroprene rubber and at least one copolymer selected from ethylene/α-olefin copolymers and ethylene/α-olefin/unconjugated polyene copolymers, 10 to 60 parts by mass of magnesium oxide, 3 to 30 parts by mass of a softener, and 30 to 120 parts by mass of acetylene black, wherein: the mixed rubber component has a Mooney viscosity, as determined by the method specified in JIS K6300, of 60 to 180 at 100° C.; the magnesium oxide has a BET specific surface area, as determined by the one point method specified in JIS Z8830, of 20 to 150 m$^2$/g; the softener contains a fatty acid ester-based plasticizer and an unsaturated fatty acid having a carbon number of 10 to 24 and containing an ester bond, a hydroxyl group, or both of them in part of the structure; and the acetylene black has a nitrogen adsorption specific surface area ($N_2SA$), as determined by the method specified in JIS K6217-2, of 50 to 160 m$^2$/g.

The chloroprene rubber above may be a mercaptan-modified chloroprene rubber or a xanthogen-modified chloroprene rubber.

Meanwhile, the rubber-based composition modifier may contain at least one aging inhibitor selected from aromatic amine-based aging inhibitors, hindered phenol-based aging inhibitors, and phosphorous acid-based aging inhibitors in a total amount of 10 to 80 parts by mass with respect to 100 parts by mass of the mixed rubber component.

Further, the rubber-based composition modifier may contain an imidazole-based aging inhibitor in an amount of 5 to 30 parts by mass with respect to 100 parts by mass of the mixed rubber component.

Further, the rubber-based composition modifier may also contain magnesium oxide, a softener, acetylene black, and an aging inhibitor in a total amount of 100 to 300 parts by mass with respect to 100 parts by mass of the mixed rubber component.

The vulcanizate according to the present invention is a vulcanizate prepared by blending the rubber-based composition modifier described above with a rubber composition containing any one or more of chloroprene rubbers, natural rubbers, and butadiene rubbers and molding and vulcanizing the blend.

Additionally, the molded product according to the present invention is a molded product that comprises the vulcanizate described above.

Advantageous Effects of Invention

The rubber-based composition modifier according to the present invention, which contains a particular mixed rubber component, a particular magnesium oxide, a particular softener, and acetylene black in particular amounts, gives a vulcanizate of a rubber composition containing the rubber-based composition modifier significantly improved in heat resistance and ozone resistance.

DESCRIPTION OF EMBODIMENTS

Hereinafter, embodiments of the present invention will be described in detail. It should be understood that the present invention shall not be limited to the embodiments described below.

First Embodiment

First, a rubber-based composition modifier according to the first embodiment of the present invention will be described in detail. The rubber-based composition modifier according to the present embodiment is a mixed rubber containing a chloroprene rubber and at least one copolymer selected from ethylene/α-olefin copolymers and ethylene/α-olefin/unconjugated polyene copolymers as the rubber components and additionally containing a particular magnesium oxide, a particular softener, and acetylene black. The rubber-based composition modifier according to the present embodiment may contain an aging inhibitor, carbon black, a softener, a filler, and the like in addition to the components described above.

[Chloroprene Rubber]

The chloroprene rubber constituting the mixed rubber component is produced by polymerizing raw monomers containing chloroprene as the major component and, as needed, cleaning and drying the resulting polymer and may contain emulsifiers, dispersants, catalysts, catalyst activators, chain-transfer agents, polymerization inhibitors, and the like that are added during polymerization in addition to the polymerization reaction product, chloroprene homopolymer or chloroprene copolymer with other monomers.

Examples of the monomers copolymerizable with chloroprene include methacrylic esters such as methyl methacrylate, butyl methacrylate, and 2-ethylhexyl methacrylate; acrylic esters such as methyl acrylate, butyl acrylate, and 2-ethylhexyl acrylate; hydroxy (meth)acrylates such as 2-hydroxyethyl (meth)acrylate, 2-hydroxymethyl (meth)acrylate, and 2-hydroxypropyl (meth)acrylate; and 2,3-dichloro-1,3-butadiene, 1-chloro-1,3-butadiene, butadiene, isoprene, ethylene, styrene, acrylonitrile, and the like.

The monomer to be copolymerized with chloroprene is not limited to one kind of monomer and, for example, three or more monomers including chloroprene may be copolymerized. The polymer structure of the chloroprene polymer is also not particularly limited.

Chloroprene rubbers are grouped grossly into sulfur-modified chloroprene rubbers and non-sulfur-modified chloroprene rubbers and the non-sulfur-modified chloroprene rubbers are further grouped into mercaptan-modified chloroprene rubbers and xanthogen-modified chloroprene rubbers according to the kind of the molecular weight modifier used. Sulfur-modified chloroprene rubbers are those prepared, as raw monomers including chloroprene as the major component and sulfur are copolymerized and the copolymer obtained is plasticized with thiuram disulfide and thus adjusted to a particular Mooney viscosity.

Alternatively, mercaptan-modified chloroprene rubbers are those prepared, as an alkylmercaptan such as n-dodecylmercaptan, tert-dodecylmercaptan, or octylmercaptan, is used as the molecular weight modifier. Yet alternatively, xanthogen-modified chloroprene rubbers are those prepared, as an alkyl xanthogen compound is used as the molecular weight modifier. The chloroprene rubber blended to the rubber composition of the present embodiment may be any one of the various chloroprene rubbers described above, but a non-sulfur-modified chloroprene rubber such as a mercaptan-modified chloroprene rubber or a xanthogen-modified chloroprene rubber is particularly favorable.

Further, chloroprene rubbers may be grouped, for example, into low-crystallization rate chloroprene rubbers, medium-crystallization rate chloroprene rubbers, and high-crystallization rate chloroprene rubbers according to their crystallization rates. Any one of the chloroprene rubbers described above may be used, as properly selected for example according to their applications, in the rubber composition of the present embodiment.

The method for producing the chloroprene rubber is not particularly limited and it is produced, for example, by polymerizing the raw monomers in the presence of an emulsifier, a polymerization initiator, a molecular weight modifier, and the like by an emulsion polymerization method commonly used. The emulsifier used then may be any one of emulsifiers used generally in emulsion polymerization of chloroprene, such as an alkali-metal salt of a saturated or unsaturated aliphatic acid having a carbon number of 6 to 22, an alkali-metal salt of rosin acid or disproportionated rosin acid or an alkali-metal salt of a β-naphthalenesulfonic acid formalin condensate.

The polymerization initiator used may be any one of known polymerization initiators generally used in emulsion polymerization of chloroprene, such as potassium persulfate, ammonium persulfate, sodium persulfate, hydrogen peroxide, or an organic peroxide such as tert-butyl hydroperoxide.

The polymerization temperature during emulsion polymerization is not particularly limited, but preferably 0 to 50° C., more preferably 20 to 50° C., from the viewpoints of productivity and polymerization stability. The final monomer conversion rate is also not particularly limited, but preferably in the range of 60 to 90% from the viewpoint of productivity.

A polymerization inhibitor is added to the polymerization solution in a small amount for termination of the polymerization reaction when the final conversion rate rises into a particular range and the polymerization inhibitor used then may be any one of polymerization inhibitors commonly used, such as 4-tert-butylcatechol, 2,2-methylenebis-4-methyl-6-tert-butylphenol, and thiodiphenylamine. After the polymerization reaction, the polymer prepared can be isolated by a common method, for example by freeze coagulation, water washing, and hot air drying, after unreacted monomers are removed for example by steam stripping method and the pH of the latex is adjusted.

[Ethylene/α-olefin Copolymer and ethylene/α-olefin/Unconjugated polyene Copolymer]

The rubber-based composition modifier according to the present embodiment contains at least one copolymer selected from ethylene/α-olefin copolymers and ethylene/α-olefin/unconjugated polyene copolymers. In this way, the heat resistance and the ozone resistance of the rubber-based composition modifier can be further improved. These ethylene/α-olefin copolymers and ethylene/α-olefin/unconjugated polyene copolymers may be used alone or in combination of two or more.

The α-olefin in the ethylene/α-olefin copolymer or the ethylene/α-olefin/unconjugated polyene copolymer is not particularly limited, but an α-olefin having a carbon number of 3 to 20 is preferable from the viewpoint of processability. Examples of the α-olefin having a carbon number of 3 to 20 include propylene, 1-butene, 1-pentene, 1-hexene, 1-heptene, 1-octene, 1-decene, and the like.

Among these α-olefins, propylene, 1-butene, 1-hexene, and 1-octene are preferable and propylene is particularly preferable from the viewpoint of the balance between processability and physical properties such as heat resistance. The α-olefin constituting the ethylene/α-olefin copolymer or the ethylene/α-olefin/unconjugated polyene copolymer is not particularly limited to a single olefin and may be a copolymer of two or more α-olefins.

Examples of the unconjugated polyenes constituting the ethylene/α-olefin/unconjugated polyene copolymer include cyclic polyenes such as 5-ethylidene-2-norbornene, dicyclopentadiene, 5-propylidene-2-norbornene, 5-vinyl-2-norbornene, 2,5-norbornadiene, 1,4-cyclohexadiene, 1,4-cyclooctadiene, and 1,5-cyclooctadiene; internal unsaturated bond-containing linear polyenes having a carbon number of 6 to 15 such as 1,4-hexadiene, 4-methyl-1,4-hexadiene, 5-methyl-1,4-hexadiene, 5-methyl-1,5-heptadiene, 6-methyl-1,5-heptadiene, 6-methyl-1,6-octadiene, 7-methyl-1,6-octadiene, 5,7-dimethyl-1,6-octadiene, 7-methyl-1,7-nonadiene, 8-methyl-1,7-nonadiene, 8-methyl-1,8-decadiene, 9-methyl-1,8-decadiene, 4-ethylidene-1,6-octadiene, 7-methyl-4-ethylidene-1,6-octadiene, 7-methyl-4-ethylidene-1,6-nonadiene, 7-ethyl-4-ethylidene-1,6-nonadiene, 6,7-dimethyl-4-ethylidene-1,6-octadiene, and 6,7-dimethyl-4-ethylidene-1,6-nonadiene; and α,ω-dienes such as 1,5-hexadiene, 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene.

Among these unconjugated polyenes, 5-ethylidene-2-norbornene, dicyclopentadiene, 5-vinyl-2-norbornene, 7-methyl-1,6-octadiene, and 5-methyl-1,4-hexadiene are preferable and 5-ethylidene-2-norbornene is particularly preferable from the viewpoint of crosslinking efficiency. The unconjugated polyene constituting the ethylene/α-olefin/unconjugated polyene copolymer is not particularly limited to a single polyene and may be a copolymer of two or more unconjugated polyenes.

The ethylene/α-olefin copolymers and the ethylene/α-olefin/unconjugated polyene copolymer described above can be produced by copolymerization of ethylene, an α-olefin and an unconjugated polyene by a known method such as gas phase polymerization method, solution polymerization method, or slurry polymerization method.

In the rubber-based composition modifier according to the present embodiment, the mixed rubber component containing a chloroprene rubber and at least one copolymer selected from ethylene/α-olefin copolymers and ethylene/α-olefin/ unconjugated polyene copolymers is characterized by a Mooney viscosity at 100° C., as determined by the method specified in JIS K6300. When the rubber-based composition modifier does not have a Mooney viscosity of 60 or more, it is less viscous, leading to deterioration in roll processability and improper distribution of blending ingredients and, when the rubber-based composition modifier has a Mooney viscosity of more than 180, it is more viscous, possibly leading to deterioration in processability and also to discoloration. Thus in the rubber-based composition modifier according to the present embodiment the mixed rubber component has a Mooney viscosity in the range of 60 to 180.

Also in the rubber-based composition modifier according to the present embodiment, the blending rate of the chloroprene rubber in the mixed rubber component containing a chloroprene rubber and at least one copolymer selected from ethylene/α-olefin copolymers and ethylene/α-olefin/unconjugated polyene copolymers is not particularly limited, but desirably in the range of 10 to 70 wt %, when the compatibility of the rubber-based composition modifier to the rubber composition, to which it is blended, and the balance between heat resistance and ozone resistance are considered.

The method of mixing the mixed rubber component containing the chloroprene rubber and at least one copolymer selected from ethylene/α-olefin copolymers and ethylene/α-olefin/unconjugated polyene copolymers is not particularly limited and it can be mixed, for example, by using a roll, a Banbury mixer, or an extruder.

[Magnesium Oxide]

Magnesium oxide has an action to improve the heat resistance of the rubber-based composition modifier by the synergic effect of the mixed rubber component and the softener and acetylene black described below and the rubber composition containing the composition also has an action to improve heat resistance. However when the magnesium oxide has a BET specific surface area of less than 20 m$^2$/g, the rubber-based composition modifier may become less stable. Alternatively, use of a magnesium oxide having a BET specific surface area of more than 150 m$^2$/g leads to deterioration of the heat resistance-improving action.

The BET specific surface area described above is a value, as determined by the one point method specified in JIS Z8830. The BET method is a method of determining the specific surface area of a test powder by making a molecule with a known molecular area (normally, N$_2$ gas) adsorbed on the surface of powder particles and determining the specific surface area from the amount of the molecule adsorbed. The specific surface area determined by the method is also called "BET specific surface area" and, in the case of magnesium oxide, a higher BET specific surface area indicates a higher activity.

When the blending amount of magnesium oxide is less than 10 parts by mass with respect to 100 parts by mass of the mixed rubber component, the rubber-based composition modifier has a lowered storage stability and, when it is blended in an amount of more than 60 parts by mass, it often results in unfavorable dispersion of magnesium oxide and vulcanization inhibition. Thus in the rubber composition of the present embodiment, magnesium oxide having a BET specific surface area of 20 to 150 m$^2$/g is blended in an amount in the range of 10 to 60 parts by mass with respect to 100 parts by mass of the mixed rubber component.

[Softener]

Examples of the softeners include fatty acid ester-based plasticizers and unsaturated fatty acids having a carbon number of 10 to 24 and containing an ester bond, a hydroxyl group, or both of them in part of the structure. These softeners have an action to improve the heat resistance and the ozone resistance of the rubber-based composition modifier by the synergic effect of the mixed rubber component described above, magnesium oxide and the acetylene black described below and the rubber compositions containing the composition also have an action to improve heat resistance and ozone resistance.

Examples of the fatty acid ester-based plasticizers that may be used include dimethyl adipate, dibutyl adipate, dioctyl adipate, di-(2-ethylhexyl) adipate, diisobutyl adipate, octyl decyl adipate, diisodecyl adipate, dibutyl diglycol adipate, di-(2-ethylhexyl) azelate, diisooctyl azelate, diisobutyl azelate, dibutyl sebacate, di-(2-ethylhexyl) sebacate, dioctyl sebacate, methyl acetyl ricinoleate, and the like.

Typical examples of the unsaturated fatty acid having a carbon number of 10 to 24 and containing an ester bond, a hydroxyl group, or both of them in part of the structure include oleic acid, linoleic acid, linolenic acid, pinolenic acid, and the like as well as the mixtures thereof, i.e., vegetable oils such as castor oil, rape seed oil, soy bean oil, sesame oil, tall oil, coconut oil, palm oil, olive oil, corn oil, safflower oil, tung oil and rice oil. When an unsaturated fatty acid containing no an ester bond or a hydroxyl group in part of the structure or an unsaturated fatty acid having a carbon number of 9 or less or 25 or more is used, it is not possible to obtain the action to improve the heat resistance and ozone resistance of the rubber-based composition modifier and the rubber composition containing the composition also cannot have an action to improve heat resistance and ozone resistance.

Among the softeners above, oleic acid and linoleic acid are preferable from the point of the balance between heat resistance and ozone resistance. The softener is not limited to a single softener and two or more softeners may be used in combination.

On the other hand when the total amount of the fatty acid ester-based plasticizer and unsaturated fatty acid described above is less than 3 parts by mass with respect to 100 parts by mass of the mixed rubber component, the rubber-based composition modifier may show discoloration by heat generation. When it is more than 30 parts by mass, the rubber-based composition modifier may become less viscous, possibly prohibiting molding and also leading to inadequate dispersion of the additives.

Thus, the rubber-based composition modifier according to the present embodiment contains at least one softener selected from fatty acid ester-based plasticizers and unsaturated fatty acids having a carbon number of 10 to 24 and containing an ester bond, a hydroxyl group, or both of them in part of the structure in an amount in the range of 3 to 30 parts by mass with respect to 100 parts by mass of the mixed rubber component.

[Acetylene Black]

Acetylene black shows an action to improve the heat resistance of the rubber-based composition modifier by the synergic effect of the mixed rubber component described above, the magnesium oxide described above, and a particular softener and the rubber composition containing the composition also has an action to improve heat resistance. The acetylene black to be blended to the rubber-based composition modifier according to the present embodiment is preferably an acetylene black having a nitrogen adsorption specific surface area ($N_2SA$), as determined by the method specified in JIS K6217-2, of 50 to 160 $m^2/g$ from the viewpoint of improvement in heat resistance.

However when the blending amount of acetylene black is less than 30 parts by mass with respect to 100 parts by mass of the mixed rubber component, the rubber-based composition modifier may become less viscous, possibly prohibiting molding and leading to inadequate dispersion of the additives. Alternatively when the blending amount of acetylene black is more than 120 parts by mass with respect to 100 parts by mass of the mixed rubber component, the rubber-based composition modifier may show discoloration by heat generation and deterioration in storage stability. Thus in the rubber composition of the present embodiment, acetylene black having a nitrogen adsorption specific surface area ($N_2SA$) of 50 to 160 $m^2/g$ is blended in an amount in the range of 30 to 120 parts by mass with respect to 100 parts by mass of the mixed rubber component.

[Aging Inhibitor]

The aging inhibitor has an action to prevent degradation of the chloroprene rubber, the ethylene/α-olefin copolymer, and the ethylene/α-olefin/unconjugated polyene copolymer blended as the mixed rubber components by ozone and heat. Examples of the aging inhibitors include aromatic amine-based aging inhibitors, hindered phenol-based aging inhibitors, phosphorous acid-based aging inhibitors, and the like.

Thus the rubber-based composition modifier according to the present embodiment preferably contains, as needed, one or more aging inhibitors selected from aromatic amine-based aging inhibitors, hindered phenol-based aging inhibitors, and phosphorous acid-based aging inhibitors in an amount in the range of 10 to 80 parts by mass with respect to 100 parts by mass of the mixed rubber component. It is possible by blending the aging inhibitor in an amount of 10 parts or more by mass with respect to 100 parts by mass of the mixed rubber component to improve the heat resistance and ozone resistance of the rubber-based composition modifier further and the rubber composition containing the composition can also improve heat resistance and ozone resistance further. It is possible by blending the aging inhibitor in an amount of 80 parts or less by mass with respect to 100 parts by mass of the mixed rubber component to prevent bleeding out of the vulcanization inhibition and the aging inhibitor, to improve various physical properties including heat resistance and to prevent product defects when the vulcanizate and the molded product are produced.

Examples of the aromatic amine-based aging inhibitors include alkylated diphenylamines, octylated diphenylamines, N-phenyl-1-naphthylamine, 4,4'-bis(α,α-dimethylbenzyl)diphenylamine, p-(p-toluenesulfonylamido)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, and the like. These aromatic amine-based aging inhibitors may be used alone or in combination of two or more.

Examples of the hindered phenol-based aging inhibitors include 4,4'-butylidenebis-(3-methyl-6-tert-butylphenol), 1,1,3-tris-(2-methyl-4-hydroxy-5-tert-butylphenyl)butane, 2,2-thiobis(4-methyl-6-tert-butylphenol), 7-octadecyl-3-(4'-hydroxy-3',5'-di-tert-butylphenyl)propionate, tetrakis-[methylene-3-(3',5'-di-tert-butyl-4'-hydroxyphenyl)propionate]metha ne, pentaerythritol tetrakis[3-(3,5-di-tert-butyl-4-hydroxyphenyl)propionate], triethyleneglycol-bis[3-(3-tert-butyl-5-methyl-4-hydroxyphenyl) propionate], 1,6-hexanediol bis[3-(3,5-di-tert-butyl-4-hydroxyphenyl) propionate], 2,4-bis(n-octylthio)-6-(4-hydroxy-3,5-di-tert-butylanilino)-1,3,5-triazine, tris-(3,5-di-tert-butyl-4-hydroxybenzyl)isocyanurate, 2,2-thio-diethylene bis[3-(3,5-di-tert-butyl-4-hydroxyphenyl)propionate], N,N'-hexamethylene bis(3,5-di-tert-butyl-4-hydroxy)-hydrocinnamamide, 2,4-bis[octylthio)methyl]-o-cresol, 3,5-di-tert-butyl-4-hydroxybenzyl-phosphonate-diethyl ester, tetrakis[methylene(3,5-di-tert-butyl-4-hydroxyhydrocinnamato)]methane, octadecyl 3-(3,5-di-tert-butyl-4-hydroxyphenyl)propionate ester, 3,9-bis[2-{3-(3-tert-butyl-4-hydroxy-5-methylphenyl)propionyloxy}-1,1-dimet hylethyl]-2,4-8,10-tetraoxaspiro[5.5]undecane, and the like. These hindered phenol-based aging inhibitors may be used alone or in combination of two or more.

Examples of the phosphorous acid-based aging inhibitors include tris(nonylphenyl)phosphite, tris(mixed mono- and di-nonylphenyl)phosphite, diphenyl monotridecyl phosphite, diphenyl mono(2-ethylhexyl)phosphite, diphenyl isodecyl phosphite, diphenyl isooctyl phosphite, diphenyl nonylphenyl phosphite, triphenyl phosphite, tris(tridecyl) phosphite, triisodecyl phosphite, tris(2-ethylhexyl) phosphite, tris(2,4-di-tert-butylpheny)phosphite, tetraphenyl dipropyleneglycol diphosphite, tetraphenyl tetra(tridecyl) pentaerythritol tetraphosphite, 1,1,3-tris(2-methyl-4-di-tridecyl phosphite-5-tert-butylphenyl)butane, 4,4'-butylidene bis(3-methyl-6-tert-butyl-di-tridecyl phosphite), 2,2'-ethylidene bis(4,6-di-tert-butylphenol)fluorophosphite, 4,4'-isopropylidene-diphenol alkyl(C12 to C15) phosphite, cyclic neopenetantetrayl bis(2,4-di-tert-butylphenyl phosphite), cyclic neopentanetetrayl bis(2,6-di-tert-butyl-4-phenylphosphite), cyclic neopentanetetrayl bis(nonylphenyl phosphite), bis(nonylphenyl)pentaerythritol diphosphite, dibutyl hydrogen phosphite, distearyl pentaerythritol diphosphite, hydrogenated bisphenol A pentaerythritol phosphite polymers, and the like. The phosphorous acid-based aging inhibitors may be used alone or in combination of two or more.

[Imidazole-Based Aging Inhibitor]

The rubber-based composition modifier according to the present embodiment may contain, as needed, an imidazole-based aging inhibitor in an amount in the range of 5 to 30 parts by mass with respect to 100 parts by mass of the mixed rubber component. It is thus possible to have an action to improve the heat resistance of the rubber-based composition modifier further and the rubber composition blended with the composition shows an action to improve heat resistance further.

However when the blending amount of the imidazole-based aging inhibitor is less than 5 parts by mass with respect to 100 parts by mass of the mixed rubber component, it may not be possible to obtain such an action described above sufficiently. Alternatively when the imidazole-based aging inhibitor is blended in an amount of more than 30 parts by mass with respect to 100 parts by mass of the mixed rubber component, the rubber-based composition modifier may show reduced storage stability.

Examples of the imidazole-based aging inhibitors include 2-mercaptobenzimidazole, 2-mercaptomethylbenzimidazole, zinc salt of 2-mercaptobenzimidazole, zinc salt of 2-mercaptomethylbenzimidazole, and the like. These imidazole-based aging inhibitors may be used alone or in combination of two or more.

The magnesium oxide, the softener, the acetylene black, and the aging inhibitor described above may be blended, as needed, in a total amount in the range of 100 to 300 parts by mass with respect to 100 parts by mass of the mixed rubber component. It is thus possible to have an action to improve the heat resistance of the rubber-based composition modifier and the rubber composition blended with the composition also shows an action to improve heat resistance.

[Other Components]

The rubber-based composition modifier according to the present embodiment may contain a reinforcing agent, a filler, and others in addition to the components described above. Specifically, carbon black other than acetylene black, silica, inorganic fillers, and the like may be blended.

The carbon black other than acetylene black may be any one of furnace blacks prepared by incomplete combustion method, thermal blacks prepared by thermal decomposition method, and channel blacks. Examples of the furnace blacks include SAF (Super Abrasion Furnace Black), ISAF (Intermediate Super Abrasion Furnace Black), IISAF (Intermediate ISAF), HAF (High Abrasion Furnace Black), MAF (Medium Abrasion Furnace Black), FEF (Fast Extruding Furnace Black), SRF (Semi-Reinforcing Furnace Black), GPF (General Purpose Furnace Black), FF (Fine Furnace Black), and CF (Conductive Furnace Black). Examples of the thermal blacks include FT (Fine Thermal Black) and MT (Medium Thermal Black) and examples of the channel blacks include EPC (Easy Processing Channel Black), MPC (Medium Processing Channel Black) and the like.

A silica arbitrarily selected from those usable as a filler for reinforcement of rubbers, such as wet silica, dry silica, and colloidal silica, may be used as the silica above.

The rubber composition of the present embodiment may contain inorganic fillers other than silica. Typical examples of the inorganic fillers that may be used include magnesium carbonate ($MgCO_3$), talc ($3MgO.4SiO_2.H_2O$), aluminum carbonate [$Al_2(CO_3)_2$], magnesium hydroxide [$Mg(OH)_2$], aluminum hydroxides [$Al(OH)_3$] such as gibbsite and bayerite, aluminas ($Al_2O_3$) such as γ-alumina and α-alumina, alumina hydrates ($Al_2O_3.H_2O$) such as boehmite and diaspore, attapulgite ($5MgO.8SiO_2.9H_2O$), titanium white ($TiO_2$), titanium black ($TiO_{2n-1}$), calcium oxide (CaO), calcium hydroxide [$Ca(OH)_2$], aluminum magnesium oxide ($MgO.Al_2O_3$), clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$), aluminum silicates ($Al_2SiO_5$, $Al_4.3SiO_4.5H_2O$, etc.), magnesium silicates ($Mg_2SiO_4$, $MgSiO_3$, etc.), calcium silicates ($Ca_2SiO_4$, etc.), aluminum calcium silicates ($Al_2O_3.CaO.2SiO_2$, etc.), magnesium calcium silicate ($CaMgSiO_4$), calcium carbonate ($CaCO_3$), zirconium oxide ($ZrO_2$), zirconium hydroxide [$ZrO(OH)_2.nH_2O$], zirconium carbonate [$Zr(CO_3)_2$], crystalline aluminosilicate salts like various zeolites which contain charge-compensating hydrogens and alkali or alkali-earth metals, and the like.

Further, the rubber-based composition modifier according to the present embodiment may contain various chemicals that are commonly used in the rubber industry, such as vulcanizing agents, vulcanization accelerators, antiscorching agents, processing aids in the range that does not impair the advantageous effects described above.

The rubber-based composition modifier according to the present embodiment can be produced by a method similar to that for common rubber compositions. Specifically, it is produced by mixing rubber components, magnesium oxide, a softener, acetylene black, and other components in a mixer such as kneader, Banbury mixer, or roll mixer at a temperature not higher than the vulcanization temperature.

As described above in detail, because the rubber-based composition modifier according to the present embodiment contains a particular mixed rubber component, a particular magnesium oxide, a particular softener, and acetylene black, vulcanizates of a rubber composition blended with the rubber-based composition modifier show significantly improved heat resistance and ozone resistance. It is also possible to make the action further improved by blending a particular aging inhibitor or adjusting the total addition amount of these additives.

Second Embodiment

Hereinafter, the second embodiment of the present invention will be described. The vulcanizate of the present embodiment is prepared by blending the rubber-based composition modifier of the first embodiment described above with any one or more rubber compositions selected from chloroprene rubbers, natural rubbers, and butadiene rubbers, molding the blend into a desired shape and vulcanizing the molded product. The polymer species and the blending ingredients in these rubber compositions are not particularly limited and blend systems commonly used can be applied.

For example, a mercaptan-modified chloroprene rubber or a xanthogen-modified chloroprene rubber may be used, each respectively one of the sulfur-modified chloroprene rubbers or non-sulfur-modified chloroprene rubbers described above, may be used as the chloroprene rubber composition and these chloroprene rubbers may be used alone or in combination of two or more.

Examples of the natural rubber compositions include natural rubbers such as SMRs, SIRs, TSRs (such as STRs) and RSSs, modified natural rubbers such as epoxidized natural rubbers, high-purity natural rubbers, hydroxylated natural rubbers, hydrogenated natural rubbers, and grafted natural rubbers. These natural rubbers may be used alone or in combination of two or more.

Examples of the butadiene rubbers that may be used include commercially available butadiene rubbers that are polymerized by using, for example, a Ziegler catalyst such as diethylaluminum chloride/cobalt-based, 4 halogenated titanium/trialkylaluminum-based, trialkylaluminum/boron trifluoride/nickel-based, or diethyl aluminum chloride/nickel-based catalyst; a lanthanoid rare earth metal catalyst such as triethylaluminum/organic acid neodymium salt/lewis acid-based catalyst; or an organic alkali metal compound. These butadiene rubbers may be used alone or in combination of two or more.

The amount of the rubber-based composition modifier blended in the rubber composition is not particularly limited and can be modified appropriately according to the desired heat resistance and ozone resistance, but an addition amount of 5 to 30 wt % with respect to the rubber composition is favorable for improved balance of physical properties.

The method of vulcanizing rubber composition blended with the rubber-based composition modifier is also not particularly limited, and the rubber composition may be vulcanized during or after molding by a vulcanization method such as press vulcanization, injection vulcanization, direct tank vulcanization, indirect tank vulcanization, direct-vapor continuous vulcanization, normal-pressure continuous vulcanization, or continuous vulcanizing press.

Vulcanization conditions such as vulcanization temperature and vulcanization period are also not particularly limited and can be determined appropriately, but the vulcanization temperature is preferably 130 to 200° C., more preferably 140 to 190° C., from the viewpoints of productivity and processing stability. The "processing stability," as used herein, is a processing characteristic that is indicated by scorch time and has a significant influence on failure rate. Specifically when the scorch time is short, the unvulcanized rubber component is vulcanized during molding at high temperature, leading to increase of molding failure rate.

The vulcanizate of the present embodiment, which is prepared from a rubber composition containing the rubber-based composition modifier of the first embodiment described above, shows heat resistance and ozone resistance significantly improved from conventional vulcanizates. For that reason, the vulcanizate of the present embodiment is applicable generally to current applications in which chloroprene rubbers, natural rubbers, and butadiene rubbers are used and shows significantly improved heat resistance and ozone resistance.

EXAMPLES

Hereinafter, advantageous effects of the present invention will be described specifically with reference to Examples and Comparative Examples of the present invention. It should be understood that the present invention shall not be restricted by these Examples.

Various ingredients were blended in the composition shown in Tables 1 and 2 and kneaded by using an 8-inch roll, to give rubber-based composition modifiers of Example (1) and Comparative Example (1).

Crude rubber Mooney viscosity at 100° C. of the mixed rubber components in the compositions shown in Tables 1 and 2 below was determined by the method specified in JIS K6300.

In addition, roll processability, dispersibility of additives, and storage stability of the rubber-based composition modifiers prepared were evaluated. The roll processability was indicated by ○ when roll processability was favorable and by x when there were troubles during processing. The dispersibility of additives was indicated by ○ if insoluble components, foreign matters, bulky aggregates, or the like were not observed when a thin 1-mm film of the compound was examined with naked eyes and by x when they were observed. Further, the Mooney viscosity at 100° C. of the compound was determined by the method specified in JIS K6300 and additionally after storage at 30° C. for a month. The storage stability was indicated by ○ if the change of the value was 10% or less and by x if it was 10% or more.

TABLE 1

| | | | | Examples of the composition of rubber-based composition modifiers of Example (1) | | | | | | | | | | |
|---|---|---|---|---|---|---|---|---|---|---|---|---|---|---|
| | | | | 1 | 2 | 3 | 4 | 5 | 6 | 7 | 8 | 9 | 10 | 11 |
| Blending composition (parts by mass) | Rubber components | Chloroprene rubber | Mercaptan-modified chloroprene rubber M-120 | 50 | | | 70 | 50 | 50 | 50 | 50 | 50 | 50 | 50 |
| | | | Xanthogen-modified chloroprene rubber DCR-66 | | 50 | | | | | | | | | |
| | | | Sulfur-modified chloroprene rubber DCR-40A | | | 20 | | | | | | | | |
| | | Elastomer | Ethylene/propylene rubber 201 | | | | | 30 | | | | | | |
| | | | Ethylene/propylene/diene rubber 552 | 50 | 50 | 80 | | 50 | 50 | 50 | 50 | 50 | 50 | 50 |

TABLE 1-continued

| | | Examples of the composition of rubber-based composition modifiers of Example (1) | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Carbon black | Acetylene black | 50 | 50 | 50 | 50 | 50 | 50 | 50 | 50 | 50 | 70 | 30 |
| Softener | Oleic acid | 13 | 13 | 13 | 13 | 13 | 13 | 13 | 13 | 10 | 20 | 5 |
| | Linoleic acid | 7 | 7 | 7 | 7 | 7 | 7 | 7 | 7 | 5 | 10 | 2 |
| Lubricant/processing aid | Stearic acid | 2 | 2 | 2 | 2 | 2 | 2 | 2 | 2 | 2 | 2 | 2 |
| Aging inhibitor | Amine-based aging inhibitor (1) | 40 | 40 | 40 | 40 | 20 | 20 | 40 | 40 | | 50 | 20 |
| | Hindered phenol-based aging inhibitor | | | | | 20 | | | | | 20 | |
| | Phosphorous acid-based aging inhibitor | | | | | | 20 | | | | 20 | |
| | Imidazole-based aging inhibitor | 10 | 10 | 10 | 10 | 10 | 10 | | 10 | 10 | 20 | 10 |
| Magnesium oxide | Magnesium oxide #30 | | | | | | | | | 30 | | |
| | Magnesium oxide #150 | 30 | 30 | 30 | 30 | 30 | 30 | 30 | 30 | | 30 | 20 |
| Total | | 252 | 252 | 252 | 252 | 252 | 252 | 242 | 252 | 207 | 362 | 189 |
| Crude rubber Mooney viscosity of mixed rubber component at 100° C. | | 120 | 95 | 98 | 97 | 120 | 120 | 120 | 120 | 120 | 120 | 120 |
| Roll processability | | ○ | ○ | ○ | ○ | ○ | ○ | ○ | ○ | ○ | ○ | ○ |
| Dispersibility of additives | | ○ | ○ | ○ | ○ | ○ | ○ | ○ | ○ | ○ | ○ | ○ |
| Storage stability | | ○ | ○ | ○ | ○ | ○ | ○ | ○ | ○ | ○ | ○ | ○ |

TABLE 2

| | | | | Examples of the comparative composition of rubber-based composition modifiers of Comparative Example (1) | | | | | | | |
|---|---|---|---|---|---|---|---|---|---|---|---|
| | | | | 1 | 2 | 3 | 4 | 5 | 6 | 7 | 8 |
| Blending composition (parts by mass) | Rubber components | Chloroprene rubber | Mercaptan-modified chloroprene rubber M-120 | | | 50 | 50 | 50 | 50 | 50 | 50 |
| | | | Xanthogen-modified chloroprene rubber DCR-66 | 20 | | | | | | | |
| | | | Sulfur-modified chloroprene rubber DCR-40A | | 80 | | | | | | |
| | | Elastomer | Ethylene/propylene rubber 201 | 80 | | | | | | | |
| | | | Ethylene/propylene/diene rubber 552 | | 20 | 50 | 50 | 50 | 50 | 50 | 50 |
| | Carbon black | | Acetylene black | 50 | 50 | 50 | 50 | 25 | 150 | 50 | 80 |
| | Softener | | Oleic acid | 13 | 13 | 13 | 13 | 13 | 13 | 1 | 25 |
| | | | Linoleic acid | 7 | 7 | 7 | 7 | 7 | 7 | 1 | 15 |
| | Lubricant/processing aid | | Stearic acid | 2 | 2 | 2 | 2 | 2 | 2 | 2 | 2 |
| | Aging inhibitor | | Amine-based aging inhibitor (1) | 40 | 40 | 40 | 40 | 40 | 40 | 40 | 40 |
| | | | Hindered phenol-based aging inhibitor | | | | | | | | |
| | | | Phosphorous acid-based aging inhibitor | | | | | | | | |
| | | | Imidazole-based aging inhibitor | 10 | 10 | 10 | 10 | 10 | 10 | 10 | 10 |
| | Magnesium oxide | | Magnesium oxide #30 | | | | | | | | |
| | | | Magnesium oxide #150 | 30 | 30 | 8 | 65 | 30 | 30 | 30 | 30 |
| Total | | | | 252 | 252 | 230 | 287 | 227 | 352 | 234 | 302 |
| Crude rubber Mooney viscosity of mixed rubber component at 100° C. | | | | 49 | 52 | 120 | 120 | 120 | 120 | 120 | 120 |
| Roll processability | | | | x | x | ○ | ○ | x | x | x | x |
| Dispersibility of additives | | | | x | x | ○ | x | x | ○ | ○ | x |
| Storage stability | | | | — | — | x | ○ | x | ○ | ○ | ○ |

As shown in Comparative Example (1) of Table 2, the rubber-based composition modifiers of comparative compositions Nos. 1 and 2, which had a crude rubber Mooney viscosity lower than 60 of the mixed rubber component, gave less viscous unvulcanized compounds, leading to deterioration in roll processability and giving a problem in dispersibility of additives. On the other hand, the rubber-based composition modifier of comparative composition No. 3, which contained a smaller amount of magnesium oxide added, gave a problem in storage stability, while the rubber-based composition modifier of comparative composition No. 4, which contained an excessive amount of magnesium oxide added, gave a problem in dispersibility of additives. Further, the rubber-based composition modifier of comparative composition No. 5, which contained a smaller amount of acetylene black added, gave a less viscous unvulcanized compound, leading to deterioration in roll processability and giving a problem in dispersibility of additives. The rubber-based composition modifier of comparative composition No. 6, which contained an excessive amount of acetylene black added, gave a compound having a higher heat generation temperature, showing discoloration and thus having a problem in storage stability. The rubber-based composition modifier of comparative composition No. 7, which contained a smaller amount of the softener added, gave a compound that had a higher heat generation temperature, leading to discoloration, while the rubber-based composition modifier of comparative composition No. 8, which contained an excessive amount of the softener added, gave a less viscous unvulcanized compound, leading to deterioration in roll processability and giving a problem in dispersibility of additives. As described above, all of the comparative compositions described in Comparative Example (1) showed unfavorable unvulcanization properties and prohibited vulcanization molding.

On the other hand, the rubber-based composition modifiers of Example (1) had no problem in unvulcanization properties and was blended with a rubber composition shown in the following Tables 3, 4, and 5, which is a chloroprene rubber, a natural rubber, or a butadiene rubber; the blend was vulcanized, and the properties thereof were evaluated.

TABLE 3

Rubber composition (A)

| Blending composition | Mercaptan-modified chloroprene rubber DCR-36 | 100 |
|---|---|---|
| | Carbon black SRF | 30 |
| | Amine-based aging inhibitor (2) | 1 |
| | Magnesium oxide #30 | 4 |
| | Thiourea-based vulcanization accelerator | 0.4 |
| | ZnO | 5 |
| | Total | 140.4 |

TABLE 4

Rubber composition (B)

| Blending composition | Natural rubber SMR-CV60 | 100 |
|---|---|---|
| | Carbon black HAF | 50 |
| | Stearic acid | 3 |
| | Amine-based aging inhibitor (2) | 1 |
| | Sulfur | 2.5 |
| | Thiazole-based vulcanization accelerator | 0.6 |
| | ZnO | 5 |
| | Total | 162.1 |

TABLE 5

Rubber composition (C)

| Blending composition | Butadiene rubber 01 | 100 |
|---|---|---|
| | Carbon black HAF | 50 |
| | Stearic acid | 2 |
| | Amine-based aging inhibitor (2) | 1 |
| | Sulfur | 1.75 |
| | Thiazole-based vulcanization accelerator | 1 |
| | Sulfenamide-based vulcanization accelerator | 1.2 |
| | ZnO | 5 |
| | Total | 161.95 |

The ingredients shown in Tables 1 to 5 are as follows:
(Rubber component)
Mercaptan-modified chloroprene rubber M-120 (manufactured by Denka Company Ltd.)
Mercaptan-modified chloroprene rubber DCR-36 (manufactured by Denka Company Ltd.)
Xanthogen-modified chloroprene rubber DCR-66 (manufactured by Denka Company Ltd.)
Sulfur-modified chloroprene rubber DCR-40A (manufactured by Denka Company Ltd.)
Ethylene/propylene rubber 201 (ESPRENE manufactured by Sumitomo Chemical Co., Ltd.)
Ethylene/propylene/diene rubber 552 (SUPRENE manufactured by SK Global Chemical Co., Ltd.)
Natural rubber SMR-CV60 (standard Malaysian natural rubber)
Butadiene rubber 01 (manufactured by JSR Corp.)
(Carbon Black)
Acetylene black (Denka Black Powder manufactured by Denka Company Ltd. (nitrogen adsorption specific surface area ($N_2SA$) (as determined by the method specified in JIS K6217-2, the same shall apply hereinafter): 69 $m^2/g$))
Carbon black SRF (Asahi #50 manufactured by Asahi Carbon Co., Ltd. (nitrogen adsorption specific surface area ($N_2SA$): 23 $m^2/g$))
Carbon black HAF (Asahi #70 manufactured by Asahi Carbon Co., Ltd. (nitrogen adsorption specific surface area ($N_2SA$): 77 $m^2/g$))
(Softener)
Oleic acid (LUNAC O-V manufactured by Kao Corp.)
Linoleic acid (Hy-Diene manufactured by KF Trading Co., Ltd.)
Lubricant/Processing Aid
Stearic acid (stearic acid 50S manufactured by New Japan Chemical Co., Ltd.)
(Aging Inhibitor)
Amine-based aging inhibitor (1) (NOCRAC CD: 4,4-bis (α,α-dimethylbenzyl)diphenylamine, manufactured by Ouchi Shinko Chemical Industrial Co., Ltd.)
Hindered phenol-based aging inhibitor (IRGANOX 1010: pentaerythritol tetrakis[3-(3,5-di-tert-butyl-4-hydroxyphenyl)propionate, manufactured by BASF Japan)
Phosphorous acid-based aging inhibitor (NOCRAC TNP: tris(nonylphenyl) phosphite, manufactured by Ouchi Shinko Chemical Industrial Co., Ltd.)
Imidazole-based aging inhibitor (NOCRAC MB: 2-mercaptobenzimidazole manufactured by Ouchi Shinko Chemical Industrial Co., Ltd.)
Amine-based aging inhibitor (2) (NOCRAC PA: N-phenyl-1-naphthylamine manufactured by Ouchi Shinko Chemical Industrial Co., Ltd.)
(Magnesium Oxide)
Magnesium oxide #30 (KYOWAMAG 30 manufactured by Kyowa Chemical Industry Co., Ltd. (BET specific surface area (as determined by the one point method specified in JIS Z8830. The same shall apply hereinafter): 40 $m^2/g$))
Magnesium oxide #150 (KYOWAMAG 150 manufactured by Kyowa Chemical Industry Co., Ltd. (BET specific surface area: 148 $m^2/g$))
(Vulcanizing Agent/Vulcanization Accelerator)
Zinc oxide (zinc oxide #2 manufactured by Sakai Chemical Industry Co., Ltd.)
Thiourea-based vulcanization accelerator (Accel 22S: ethylene thiourea manufactured by Kawaguchi Chemical Industry Co., Ltd.)
Sulfur (oil-treated sulfur manufactured by Hosoi Chemical Industry Co., Ltd.)

Thiazole-based vulcanization accelerator (NOCCELER DM: di-2-benzothiazolyl disulfide manufactured by Ouchi Shinko Chemical Industrial Co., Ltd.)

Sulfenamide-based vulcanization accelerator (NOCCELER CZ: N-cyclohexyl-2-benzothiazolylsulfenamide manufactured by Ouchi Shinko Chemical Industrial Co., Ltd.)

<Evaluation>

Rubber composition (A) and each of the rubber-based composition modifiers of compositions Nos. 1 to 11 in Example (1) prepared by the method described above were blended at a weight ratio of 90:10 and the blend was vulcanized by a hydraulic press at 160° C. for 20 minutes, to give a test piece. Similarly, rubber composition (B) or (C) and each of the rubber-based composition modifiers of compositions Nos. 1 to 11 in Example (1) prepared by the method described above were blended at a weight ratio of 90:10 and the blend was vulcanized by a hydraulic press at 150° C. for 10 minutes, to give a test piece. The elongation at break (EB), hardness (HS) and heat resistance, and ozone resistance of the test piece were determined.

The elongation at break (EB) was determined according to JIS K6251. Alternatively, the hardness (HS) was determined according to JIS K6253, using a durometer hardness tester. Yet alternatively, the heat resistance was evaluated from the results obtained after the test piece was left in a gear oven at 100° C. or 120° C. for 360 hours and then the elongation at break and the hardness of the test piece were determined.

On the other hand, the ozone resistance was evaluated according to JIS K6259. Specifically, cracking on the test piece was examined, after it was left under a condition of 20% static extension and 40° C.×50 pphm for 24 or 12 hours. When there was no cracking on the test piece then, ozone resistance was indicated by "N.C." When there was cracking observed, the ozone resistance was ranked according to the number of cracks (A to B) and the size and depth of the cracks (1 to 5) in combination. The results above are summarized in the following Tables 6 to 11.

TABLE 6

Example (2)
Vulcanization physical properties of the blend of rubber composition (A) and rubber composition modifier of Example (1): 90/10 (by weight)

| | | Composition 1 | Composition 2 | Composition 3 | Composition 4 | Composition 5 | Composition 6 | Composition 7 | Composition 8 | Composition 9 | Composition 10 | Composition 11 |
|---|---|---|---|---|---|---|---|---|---|---|---|---|
| Tensile characteristics | Elongation at break EB (%) | 548 | 552 | 530 | 546 | 518 | 515 | 505 | 519 | 493 | 518 | 529 |
| | Hardness HS (—) | 64 | 64 | 63 | 64 | 63 | 64 | 62 | 64 | 64 | 65 | 62 |
| Heat resistance | 120° C. × 360 hr deterioration in gear oven | Elongation at break EB (%) | 391 | 387 | 353 | 380 | 280 | 283 | 300 | 393 | 149 | 394 | 308 |
| | | Hardness HS (—) | 73 | 74 | 74 | 73 | 77 | 77 | 76 | 73 | 81 | 73 | 75 |
| Ozone resistance | 40° C. × 50 pphm × 20% extension × 24 hr static ozone test | Edge | N.C. | N.C. | N.C. | A-1 | N.C. | N.C. | N.C. | N.C. | N.C. | N.C. | N.C. |
| | | Surface | N.C. | N.C. | N.C. | B-1 | N.C. | N.C. | N.C. | N.C. | N.C. | N.C. | N.C. |

TABLE 7

|  |  |  | Comparative Example (2)<br>Rubber composition (A):<br>100 (by weight) |
|---|---|---|---|
| Tensile characteristics | Elongation at break EB (%) |  | 522 |
|  | Hardness HS (—) |  | 60 |
| Heat resistance | 120° C. × 360 hr deterioration in gear oven | Elongation at break EB (%) | 97 |
|  |  | Hardness HS (—) | 85 |
| Ozone resistance | 40° C. × 50 pphm × 20% extension × 24 hr static ozone test | Edge | C-2 |
|  |  | Surface | C-2 |

TABLE 8

Example (3)
Vulcanization physical properties of the blend of rubber composition (B) and rubber composition modifier of Example (1): 90/10 (by weight)

|  |  |  | Composition 1 | Composition 2 | Composition 3 | Composition 4 | Composition 5 | Composition 6 | Composition 7 | Composition 8 | Composition 9 | Composition 10 | Composition 11 |
|---|---|---|---|---|---|---|---|---|---|---|---|---|---|
| Tensile characteristics | Elongation at break EB (%) |  | 649 | 652 | 650 | 628 | 614 | 618 | 614 | 622 | 590 | 622 | 640 |
|  | Hardness HS (—) |  | 57 | 57 | 58 | 58 | 58 | 58 | 57 | 58 | 58 | 57 | 58 |
| Heat resistance | 100° C. × 360 hr deterioration in gear oven | Elongation at break EB (%) | 264 | 266 | 258 | 268 | 235 | 238 | 260 | 290 | 205 | 280 | 280 |
|  |  | Hardness HS (—) | 71 | 70 | 72 | 70 | 71 | 70 | 70 | 69 | 72 | 70 | 72 |
| Ozone resistance | 40° C. × 50 pphm × 20% extension × 12 hr static ozone test | Edge | B-2 | B-2 | A-2 | C-2 | B-2 | B-2 | B-2 | B-2 | B-2 | B-3 | B-2 |
|  |  | Surface | B-3 | B-3 | A-2 | B-3 | B-3 | B-3 | B-3 | B-3 | B-3 | B-3 | B-3 |

TABLE 9

|  |  |  | Comparative Example (3)<br>Rubber composition (B):<br>100 (by weight) |
|---|---|---|---|
| Tensile characteristics | Elongation at break EB (%) |  | 608 |
|  | Hardness HS (—) |  | 58 |
| Heat resistance | 100° C. × 360 hr deterioration in gear oven | Elongation at break EB (%) | 185 |
|  |  | Hardness HS (—) | 73 |
| Ozone resistance | 40° C. × 50 pphm × 20% extension × 12 hr static ozone test | Edge | C-4 |
|  |  | Surface | C-5 |

TABLE 10

Example (4)
Vulcanization physical properties of the blend of rubber composition (C) and rubber composition modifier of Example (1): 90/10 (by weight)

|  |  |  | Composition 1 | Composition 2 | Composition 3 | Composition 4 | Composition 5 | Composition 6 | Composition 7 | Composition 8 | Composition 9 | Composition 10 | Composition 11 |
|---|---|---|---|---|---|---|---|---|---|---|---|---|---|
| Tensile characteristics | Elongation at break EB (%) |  | 314 | 333 | 318 | 322 | 313 | 310 | 309 | 324 | 306 | 340 | 342 |
|  | Hardness HS (—) |  | 69 | 69 | 69 | 69 | 69 | 69 | 68 | 69 | 69 | 70 | 70 |
| Heat resistance | 100° C. × 360 hr deterioration in gear oven | Elongation at break EB (%) | 160 | 163 | 153 | 170 | 150 | 152 | 158 | 180 | 140 | 179 | 176 |
|  |  | Hardness HS (—) | 79 | 79 | 79 | 78 | 80 | 80 | 79 | 79 | 80 | 79 | 79 |

TABLE 10-continued

Example (4)
Vulcanization physical properties of the blend of rubber composition (C) and rubber composition modifier of Example (1): 90/10 (by weight)

| | | | Composition 1 | Composition 2 | Composition 3 | Composition 4 | Composition 5 | Composition 6 | Composition 7 | Composition 8 | Composition 9 | Composition 10 | Composition 11 |
|---|---|---|---|---|---|---|---|---|---|---|---|---|---|
| Ozone resistance | 40° C. × 50 pphm × 20% extension × 12 hr static ozone test | Edge | A-2 | A-2 | A-1 | A-2 | A-2 | A-2 | A-2 | A-2 | A-2 | A-2 | A-2 |
| | | Surface | A-1 | A-1 | N.C. | A-2 | A-1 | A-1 | A-1 | A-1 | A-1 | A-1 | A-1 |

TABLE 11

| | | | Comparative Example (4) Rubber composition (C): 100 (by weight) |
|---|---|---|---|
| Tensile characteristics | Elongation at break EB (%) | | 272 |
| | Hardness HS (—) | | 69 |
| Heat resistance | 100° C. × 360 hr deterioration in gear oven | Elongation at break EB (%) | 96 |
| | | Hardness HS (—) | 80 |
| Ozone resistance | 40° C. × 50 pphm × 20% extension × 12 hr static ozone test | Edge | C-2 |
| | | Surface | C-2 |

As described above, the test pieces of Example (2) shown in Table 6, Example (3) shown in Table 8, and Example (4) shown in Table 10, which were test pieces obtained by blending the rubber-based composition modifier described in Example (1) and vulcanizing the blend, showed lower deterioration in elongation at break and lower increase in hardness after the test piece was left under a temperature condition of 100° C. or 120° C. for 360 hours and were thus superior in heat resistance, compared to the vulcanized test pieces shown in Tables 7, 9, and 11, which did not contain the modifier. They were also superior in ozone resistance after 24 hours or 12 hours under a condition of 20% static extension and 40° C.×50 pphm. The results above demonstrate that it is possible according to the present invention to prepare a rubber-based composition modifier that gives a vulcanizate superior in heat resistance and ozone resistance and the rubber composition containing the modifier is superior in heat resistance and ozone resistance.

When the vulcanizate containing the composition No. 1 of Example (2) and the vulcanizate containing the composition No. 7 were compared, the vulcanizate containing the composition No. 1 that contains an imidazole-based aging inhibitor showed lower deterioration in elongation at break and lower increase in hardness and was thus superior in heat resistance.

When the vulcanizate containing the composition No. 8 of Example (3) and the vulcanizate containing the composition No. 10 were compared, the vulcanizate containing composition No. 8 that contains the aging inhibitor in an amount of 80 parts or less by mass with respect to 100 parts by mass of the mixed rubber component showed lower deterioration in elongation at break and lower increase in hardness and was thus superior in heat resistance.

Further when the vulcanizate containing the composition No. 1 of Example (2) and the vulcanizate containing the composition No. 11 were compared, the vulcanizate containing the composition No. 1 that contains magnesium oxide, a softener, acetylene black, and an aging inhibitor in a total amount in the range of 100 to 300 parts by mass showed lower deterioration in elongation at break and lower increase in hardness and was thus superior in heat resistance.

The invention claimed is:

1. A rubber-based composition modifier, comprising
   100 parts by mass of a mixed rubber component containing 20 to 50 wt % of a chloroprene rubber and 50 to 80 wt % of an ethylene/α-olefin/unconjugated polyene copolymer,
   20 to 60 parts by mass of magnesium oxide,
   3 to 30 parts by mass of a softener, and
   30 to 120 parts by mass of acetylene black, wherein:
   the mixed rubber component has a Mooney viscosity, as determined by the method specified in JIS K6300, of 60 to 180 at 100° C.;
   the magnesium oxide has a BET specific surface area, as determined by the one point method specified in JIS Z8830, of 20 to 150 m$^2$/g;
   the softener contains at least one selected from the group consisting of oleic acid, linoleic acid, linolenic acid, pinolenic acid, castor oil, rape seed oil, soy bean oil, sesame oil, tall oil, coconut oil, palm oil, olive oil, corn oil, safflower oil, tung oil and rice oil; and
   the acetylene black has a nitrogen adsorption specific surface area (N$_2$SA), as determined by the method specified in JIS K6217-2, of 50 to 160 m$^2$/g.

2. The rubber-based composition modifier according to claim 1, wherein the chloroprene rubber is a mercaptan-modified chloroprene rubber or a xanthogen-modified chloroprene rubber.

3. The rubber-based composition modifier according to claim 1, further comprising at least one aging inhibitor selected from aromatic amine-based aging inhibitors, hindered phenol-based aging inhibitors, and phosphorous acid-based aging inhibitors in a total amount of 10 to 80 parts by mass with respect to 100 parts by mass of the mixed rubber component.

4. The rubber-based composition modifier according to claim 1, further comprising an imidazole-based aging inhibitor in an amount of 5 to 30 parts by mass with respect to 100 parts by mass of the mixed rubber component.

5. The rubber-based composition modifier according to claim 4, wherein the magnesium oxide, softener, acetylene black and aging inhibitor are contained in a total amount of 100 to 300 parts by mass with respect to 100 parts by mass of the mixed rubber component.

6. A vulcanizate prepared by vulcanizing a rubber composition containing any one or more of chloroprene rubbers, natural rubbers, and butadiene rubbers and a composition containing the rubber-based composition modifier according to claim 1.

7. A molded product comprising the vulcanizate according to claim 6.

8. A rubber-based composition modifier, comprising:
   100 parts by mass of a mixed rubber component containing 20 to 50 wt % of a chloroprene rubber and 50 to 80 wt % of an ethylene/α-olefin/unconjugated polyene copolymer,
   20 to 60 parts by mass of magnesium oxide,
   3 to 30 parts by mass of a softener, and
   30 to 120 parts by mass of acetylene black, wherein:
   the mixed rubber component has a Mooney viscosity, as determined by the method specified in JIS K6300, of 60 to 180 at 100° C.;
   the magnesium oxide has a BET specific surface area, as determined by the one point method specified in JIS Z8830, of 20 to 150 $m^2/g$;
   the softener contains at least one selected from the group consisting of a fatty acid ester-based plasticizer and an unsaturated fatty acid having a carbon number of 10 to 24 and containing an ester bond, a hydroxyl group, or both of them in part of the structure; and
   the acetylene black has a nitrogen adsorption specific surface area ($N_2SA$), as determined by the method specified in JIS K6217-2, of 50 to 160 $m^2/g$.

9. The rubber-based composition modifier according to claim 8, wherein the chloroprene rubber is a mercaptan-modified chloroprene rubber or a xanthogen-modified chloroprene rubber.

10. The rubber-based composition modifier according to claim 9, further comprising an imidazole-based aging inhibitor in an amount of 5 to 30 parts by mass with respect to 100 parts by mass of the mixed rubber component.

11. The rubber-based composition modifier according to claim 10, wherein the magnesium oxide, softener, acetylene black and aging inhibitor are contained in a total amount of 100 to 300 parts by mass with respect to 100 parts by mass of the mixed rubber component.

12. The rubber-based composition modifier according to claim 8, further comprising at least one aging inhibitor selected from aromatic amine-based aging inhibitors, hindered phenol-based aging inhibitors, and phosphorous acid-based aging inhibitors in a total amount of 10 to 80 parts by mass with respect to 100 parts by mass of the mixed rubber component.

13. A vulcanizate prepared by vulcanizing a rubber composition containing any one or more of chloroprene rubbers, natural rubbers, and butadiene rubbers and a composition containing the rubber-based composition modifier according to claim 8.

14. A molded product comprising the vulcanizate according to claim 13.

* * * * *